United States Patent Office 3,190,879
Patented June 22, 1965

3,190,879
INTERMEDIATES IN THE PREPARATION OF 3β-HYDROXY-20-OXO-5α-PREGNANE
Wataru Nagata, Nishinomiya-shi, Hyogo, Tadao Terasawa, Takatsuki-shi, Osaka, and Tsutomu Aoki, Amagasaki-shi, Hyogo, Japan, assignors to Shionogi & Co., Ltd., Osaka, Japan
No Drawing. Filed Mar. 13, 1964, Ser. No. 351,838
Claims priority, application Japan, Mar. 14, 1963, 38/14,297, 38/14,298, 38/14,299
8 Claims. (Cl. 260—239.55)

The present invention relates to total synthesis of steroid, and particularly to a process for synthesizing 3β-hydroxy-20-oxo-5α-pregnane which is applicable in industry.

Although there have been reported a number of totally synthetic methods of preparing steroids, most of them give the objective steroids only in very low yields and can not be practically adopted in industry.

There has been now completed a totally synthetic method of preparing 3β-hydroxy-20-oxo-5α-pregnane in which the total yield of the said compound is so high that it makes it possible to actually adopt the process in industry.

Accordingly, a basic object of the present invention is to provide a totally synthetic method of preparing 3β-hydroxy-20-oxo-5α-pregnane. Another object of this invention is to provide an industrially applicable process for preparing 3β-hydroxy-20-oxo-5α-pregnane. A further object of the invention is to provide a process for preparing intermediates in the total synthesis of 3β-hydroxy-20-oxo-5α-pregnane in good yields. These and other objects will be apparent to those conversant with the art to which the present invention pertains from the subsequent description.

The process of the present invention can be illustrated by the following scheme:

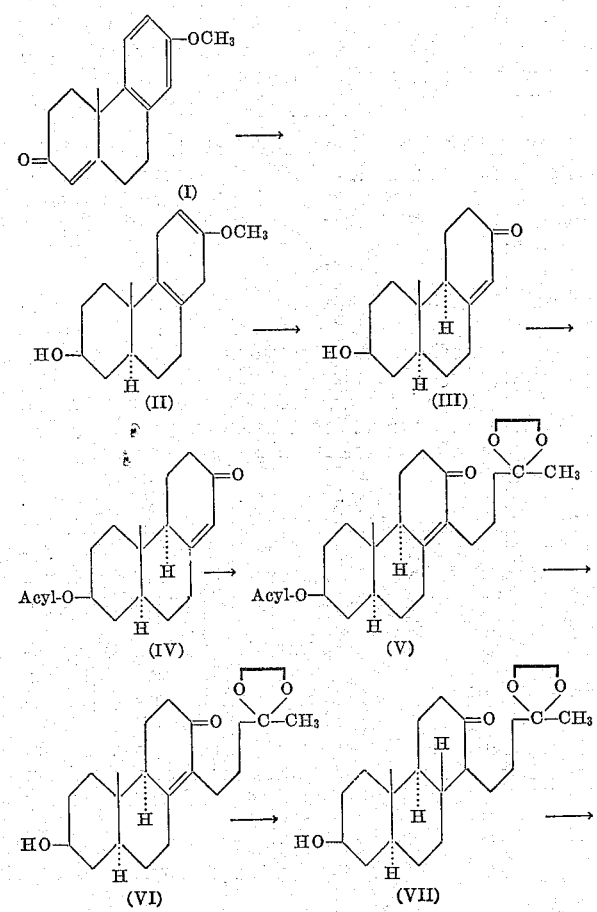

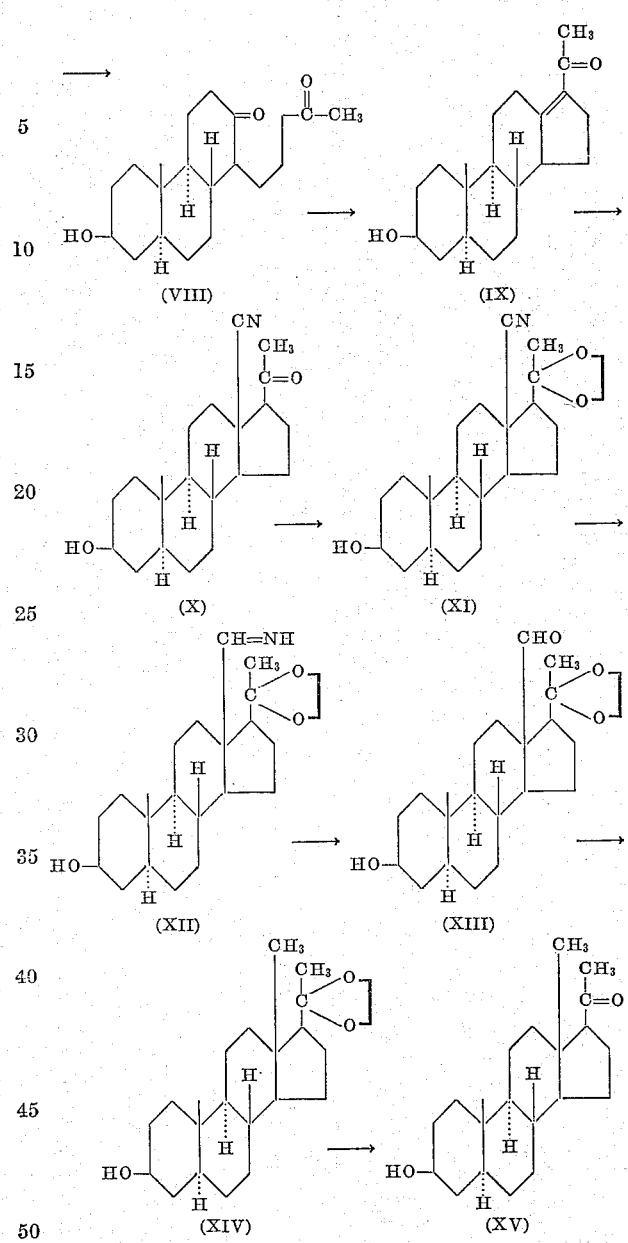

wherein acyl represents an acyl group such as lower alkanoyl (e.g. acetyl, propionyl, butyryl), benzoyl and lower alkylbenzoyl (e.g. toluoyl, xyloyl).

The starting material of the present invention is a known compound, i.e. 2,3,4,9,10,12β-hexahydro-7-methoxy-12β-methyl-2-oxophenanthrene [Howell et al.: J. Chem. Soc., p. 1248 (1958)].

According to the present invention, the starting 2,3,4,9,10,12β - hexahydro - 7 - methoxy - 12β - methyl-2-oxophenanthrene (I) is first subjected to reduction. The reduction may be carried out by treating 2,3,4,9,10,12β-hexahydro-7-methoxy-12β-methyl-2-oxophenanthrene (I) with metallic lithium in liquid ammonia in the presence of a lower alkanol (e.g. methanol, ethanol, propanol), usually at a relatively low temperature (e.g. −70 to −80° C.). Sometimes a co-solvent such as ether, dioxane and tetrahydrofuran may be used as the reaction solvent. A considerable excess amount of metallic lithium, usually from about 50 to about 150 moles to one mole of the starting 2,3,4,9,10,12β-hexahydro-7-methoxy-12β-methyl-2-oxophenanthrene (I), should be used for obtaining a favorably high yield of the product, i.e. 1,2,3,4,5,8,9,10, 11α,12β-decahydro-2β-hydroxy-7-methoxy - 12β - methylphenanthrene (II).

The 1,2,3,4,5,8,9,10,11α,12β-decahydro-2β-hydroxy-7-methoxy-12β-methylphenanthrene (II) is then subjected to hydrolysis. The hydrolysis may be carried out by treating 1,2,3,4,5,8,9,10,11α,12β-decahydro-2β-hydroxy-7-methoxy-12β-methylphenanthrene (II) with an acid such as an inorganic acid (e.g. hydrochloric acid, sulfuric acid) and an organic acid (e.g. acetic acid, oxalic acid) at a temperature from about 10 to about 100° C., usually while heating on a water bath. In the hydrolysis, a water-miscible organic solvent such as methanol, ethanol and tetrahydrofuran may be used for effecting the reaction smoothly.

The resultant 1,2,3,4,5,6,7,9,10,11α,12β,13α-dodecahydro-2β-hydroxy-12β-methyl-7-oxophenanthrene (III) is then subjected to acylation. The acylation may be executed by treating 1,2,3,4,5,6,7,9,10,11α,12β,13α-dodecahydro-2β-hydroxy - 12β - methyl - 7 - oxophenanthrene (III) with an organic acid anhydride (e.g. acetic anhydride, propionic anhydride, benzoic anhydride) or an organic acid halide (e.g. acetyl chloride, propionyl chloride, benzoyl chloride) in the presence of an organic base (e.g. pyridine, picoline, trimethylamine) at a temperature from room temperature (10 to 30° C.) to refluxing temperature.

The resulting 1,2,3,4,5,6,7,9,10,11α,12β,13α-dodecahydro-2β-acyloxy-12β-methyl-7-oxophenanthrene (IV) is then subjected to condensation with 1-halogeno-4-oxopentane ethyleneketal. Thus, the condensation may be effected by treating 1,2,3,4,5,6,7,9,10,11α,12β,13α-dodecahydro-2β-acyloxy-12β-methyl - 7 - oxophenanthrene (IV) with 1-halogeno-4-oxopentane ethyleneketal in the presence of an alkali metal hydride (e.g. sodium hydride, potassium hydride) or an alkali metal amide (e.g. sodium amide, potasium amide) in an inert organic solvent (e.g. benzene, toluene, xylene), usually around a boiling temperature of the mixture. In general, the reaction is preferred to be carried out in an inert gas such as nitrogen.

Then, the resultant 1,2,3,4,5,6,7,9,10,11α12β,13α-dodecahydro - 2β - acyloxy-8-(4,4-ethylenedioxypentyl)-12β-methyl-7-oxophenanthrene (V) is subjected to hydrolysis. The hydrolysis may be carried out by treating 1,2,3,4,5,6,7,9,10,11α-12β,13α-dodecahydro - 2β - acyloxy-8-(4,4-ethylenedioxypentyl)-12β-methyl - 7 - oxophenanthrene (V) with an alkali (e.g. sodium hydroxide, sodium carbonate, potassium carbonate) in an aqueous lower alkanol (e.g. methanol, ethanol), usually while refluxing.

The resulting 1,2,3,4,5,6,7,9,10,11α-12β,13α-dodecahydro - 2β - hydroxy - 8 - (4,4-ethylenedioxypentyl)-12β-methyl-7-oxophenanthrene (VI) is then subjected to reduction. The reduction may be executed by treating 1,2,3,4,5,6,7,9,10,11α,12β,13α - dodecahydro-2β-hydroxy-8-(4,4-ethylenedioxypentyl)-12β-methyl - 7 - oxophenanthrene (VI) with an alkali metal (e.g. lithium, sodium) or an alkaline earth metal (e.g. calcium) in liquid ammonia at a relatively low temperature (e.g. —70 to —80° C.), followed by treatment of the reaction mixture with a suitable proton source (e.g. ammonium chloride). In order to carry out the reaction smoothly, there may be used a suitable co-solvent (e.g. ether, dioxane, tetrahydrofuran).

The thus-prepared 1,2,3,4,5,6,7,8,9,10,11α,12β,13α,14β-tetradecahydro - 2β - hydroxy - 8β - (4,4 - ethylenedioxypentyl)-12β-methyl-7-oxophenanthrene (VII) is then subjected to deketalation. The deketalation may be effected by treating 1,2,3,4,5,6,7,8,9,10,11α,12β,13α,14β-tetradecahydro-2β-hydroxy-8β-(4,4 - ethylenedioxypentyl) - 12β - methyl-7-oxophenanthrene (VII) with an organic acid (e.g. acetic acid, p-toluenesulfonic acid) or an inorganic acid (e.g. hydrochloric acid, sulfuric acid), usually in an aqueous medium, at a temperature from room temperature (e.g. 10 to 30° C.) to refluxing temperature.

Then, the resulting 1,2,3,4,5,6,7,8,9,10,11α,12β,13α, 14β-tetradecahydro-2β-hydroxy-8β-(4 - oxopentyl) - 12β-methyl-7-oxophenanthrene (VIII) is subjected to cyclization. The cyclization may be carried out by treating 1,2,3,4,5,6,7,8,9,10,11α,12β,13α,14β-tretradecahydro - 2β-hydroxy-8β-(4 - oxopentyl) - 12β-methyl - 7 - oxophenanthrene (VIII) with an alkali hydroxide (e.g. sodium hydroxide, potassium hydroxide) in a lower alkanol (e.g. methanol, ethanol, propanol) diluted with water. For the successful accomplishment of the cyclization, the use of a mixture of a lower alkanol and water is indispensable. The mixing ratio of a lower alkanol to water depends on the kind of the used lower alkanol, and such a high dilution as 1 to 5~20 by weight is generally preferred. The reaction can proceed within a range of temperature from about 50 to about 100° C.

The thus-obtained 3β - hydroxy - 20-oxo-18-nor-5α-13-(17)-pregnene (IX) is further subjected to angular cyanation. The angular cyanation is preferred to be effected according to the method described and claimed in the copending application of W. Nagata, Serial No. 261,215, filed February 26, 1963. Thus, the object can be attained by treating 3β - hydroxy - 20-oxo-18-nor-5α-13(17)-pregnene (IX) with a complex anion represented by the formula:

[AlRR'R"CN]⁻ wherein R represents a lower alkyl group (e.g. methyl, ethyl, propyl, butyl) or a lower alkoxy group (e.g. methoxy, ethoxy, propoxy, butoxy) and R' and R" each represents a lower alkyl group (e.g. methyl, ethyl, propyl, butyl), a lower alkoxy group (e.g. methoxy, ethoxy, propoxy, butoxy), a halogen atom (e.g. chlorine, bromine) or a cyano group in a substantially anhydrous medium, followed by treatment with an alkali in an aqueous medium. The said complex anion can be produced, for instance, by treating an aluminum compound represented by the formula:

AlRR'R"

wherein R, R' and R" each has the same significance as designated above with hydrocyanic acid in a substantially anhydrous medium or treating the aluminum compound with an aluminum cyanide compound represented by the formula:

AlRR'CN wherein R and R' each has the same significance as designated above in a substantially anhydrous medium, the aluminum cyanide compound being prepared by treating an aluminum hydride compound represented by the formula:

AlRR'H wherein R and R' each has the same significance as designated above with hydrocyanic acid in a substantially anhydrous medium. As the reaction medium, there may be employed an inert non-polar solvent such as benzene, ether, tetrahydrofuran and dioxane. The reaction can proceed at a temperature from room temperature (10 to 30° C.) to reflux temperature, preferably around room temperature.

The resultant 3β - hydroxy - 20 - oxo - 5α-pregnane-18-nitrile (X) is then subjected to ketalation. The ketalation may be executed by treating 3β-hydroxy-20-oxo-5α-pregnane-18-nitrile (X) with ethyleneglycol in the presence of an acid such as p-toluenesulfonic acid and sulfuric acid, usually while refluxing.

The thus-prepared 3β-hydroxy-20,20-ethylenedioxy-5α-pregnane-18-nitrile (XI) is then subjected to reduction. The reduction may be effected by treating 3β-hydroxy-20,20-ethylenedioxy-5α-pregnane-18-nitrile (XI) with a hydrogenated metal complex such as lithium aluminum hydride, sodium aluminum hydride, magnesium aluminum hydride, aluminum hydride, lithium aluminum and alkoxy hydride in an inert organic solvent (e.g. ether, dioxane, tetrahydrofuran) at a temperature from room temperature (10 to 30° C.) to refluxing temperature.

The resultant 3β - hydroxy - 18 - imino-20,20-ethylenedioxy-5α-pregnane (XII) is further subjected to partial hydrolysis. The hydrolysis may be carried out by treating 3β - hydroxy - 18-imino-20,20-ethylenedioxy-5α-pregnane with an acid or a base in a suitable solvent (e.g. methanol, ethanol). The use of a buffer solution of acetic acid and sodium acetate is preferred. The reaction is usually performed while refluxing.

The resulting 3β-hydroxy-20,20-ethylenedioxy-5α-pregnan-18-al (XIII) is then subjected to reduction. The reduction may be realized by a per se conventional procedure, i.e. so-called Wolff-Kishner reduction or Huang-Minlon reduction. Thus, 3β-hydroxy - 20,20 - ethylenedioxy-5α-pregnan-18-al (XIII) is treated with an alkali hydroxide (e.g. potassium hydroxide), hydrazine hydrate and a lower alkyleneglycol (e.g. diethyleneglycol, triethyleneglycol), followed by decomposition of the resultant product with water to give 3β-hydroxy-20,20-ethylenedioxy-5α-pregnane (XIV).

Finally, the thus-prepared 3β-hydroxy-20,20-ethylenedioxy-5α-pregnane (XIV) is subjected to deketalation. The deketalation can be accomplished by a per se conventional procedure, i.e. treatment with an acid (e.g. acetic acid, hydrochloric acid, sulfuric acid) in an aqueous medium ordinarily while refluxing.

Although the process of the present invention is hereinbefore illustrated step by step, some of these steps may be executed successively without purification of the product in each step.

The finally produced 3β - hydroxy - 20-oxo-5α-pregnane (XV) is a known compound and can be converted into various physiologically active steroids by conventional methods.

Presently-preferred embodiments of the present invention are shown in the following examples.

*Example 1*

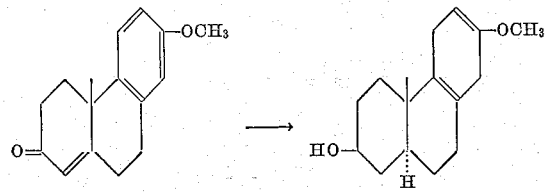

To a solution of metallic lithium (28 g.) in liquid ammonia (1800 ml.), there is added dropwise a solution of 2,3,4,9,10,12β-hexahydro-7-methoxy-12β-methyl-2-oxophenanthrene (11 g.) in a mixture of anhydrous dioxane (70. ml.) anhydrous ethanol (110 ml.) and anhydrous ether (370 ml.) in 1 hour at −70 to −80° C. while stirring. Stirring is further continued for 15 minutes. Anhydrous ethanol (660 ml.) is dropwise added to the resultant mixture until the blue colour disappears. Then, the ammonia is evaporated at room temperature (10 to 30° C.). The resultant mixture is combined with a large amount of water and shaken with a mixture of chloroform and ether (1:3). The organic solvent layer is washed with saturated sodium chloride solution, dried over anhydrous sodium sulfate and the solvent evaporated under reduced pressure. The residue is crystallized from a mixture of acetone and ether to give 1,2,3,4,5,8,9,10,11α,12β-decahydro - 2β - hydroxy - 7-methoxy-12β-methylphenanthrene (8.35 g.) as crystals melting at 132 to 135° C. Yield, 74.1%.

*Example 2*

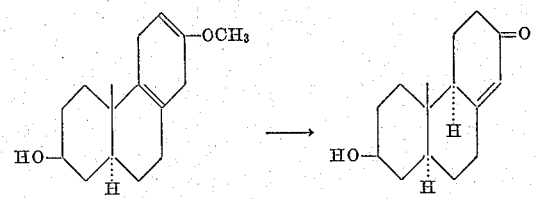

To a solution of 1,2,3,4,5,8,9,10,11α,12β-decahydro-2β-hydroxy-7-methoxy-12β-methylphenanthrene (500 mg.) in methanol (30 ml.), there is added 4 N hydrochloric acid (8 ml.), and the resultant mixture is refluxed on a water bath for 20 minutes. The reaction mixture is concentrated under reduced pressure, combined with a large amount of water and shaken with ether. The ether layer is washed with 2 N sodium carbonate solution and water in order, dried over anhydrous sodium sulfate and the solvent evaporated under reduced pressure. The oily residue (362 mg.) is crystallized from a mixture of acetone and ether to give 1,2,3,4,5,6,7,9,10,11α,12β,13α-dodecahydro - 2β - hydroxy - 12β-methyl-7-oxophenanthrene (314 mg.) as crystals melting at 121 to 123° C. Yield, 66.7%.

*Example 3*

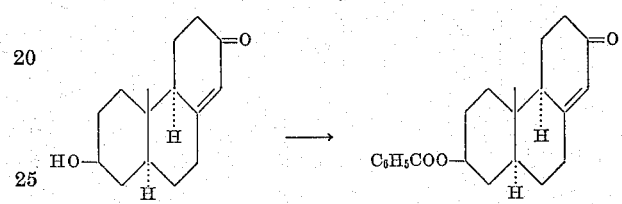

To a solution of 1,2,3,4,5,6,7,9,10,11α,12β-13α-dodecahydro - 2β - hydroxy - 12β-methyl-7-oxophenanthrene (1.74 g.) in anhydrous pyridine (12 ml.), there is added benzoyl chloride (2g.) while cooling with ice, and the resultant mixture is stirred for a while and then allowed to stand at room temperature (10 to 30° C.) overnight. The reaction mixture is combined with water and shaken with chloroform. The chloroform layer is washed with dilute sulfuric acid, water, sodium carbonate solution and water in turn, dried over anhydrous sodium sulfate and the solvent evaporated under reduced pressure. The residue (3.2 g.) is crystallized from a mixture of acetone and ether to give 1,2,3,4,5,6,7,9,10,11α,12β,13α-dodecahydro-2β-benzoyloxy-12β-methyl-7-oxophenanthrene (2.19 g.) as crystals melting at 178.5 to 179.5° C. Yield, 87.3%.

*Example 4*

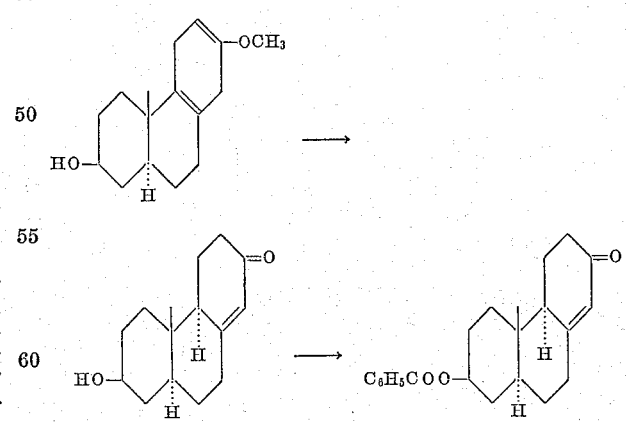

4 N hydrochloric acid (700 ml.) is added to a solution of 1,2,3,4,5,8,9,10,11α,12β-decahydro-2β-hydroxy-7-methoxy-12β-methylphenanthrene (40 g.) in methanol (2000 ml.) while refluxing on a water bath, and the resultant mixture is refluxed for 15 minutes. The reaction mixture is concentrated under reduced pressure and poured onto a mixture of ice and water. The resultant mixture is shaken with chloroform. The chloroform layer is washed with 2 N sodium carbonate solution and water in order, dried over anhydrous sodium sulfate and the solvent evaporated. The resultant crude 1,2,3,4,5,6,7,9,10, 11α,12β,13α - dodecahydro - 2β - hydroxy-12β-methyl-7-oxophenanthrene (43.73 g.) is dissolved in anhydrous pyridine (20 ml.), combined with benzoyl chloride (33.8 g.) and the resultant mixture allowed to stand at room temperature (10 to 30° C.) overnight. The reaction mixture is combined with water and shaken with chloroform. The chloroform layer is washed with dilute sulfuric acid, water, sodium carbonate solution and water in turn, dried over anhydrous sodium sulfate and the solvent evaporated under reduced pressure. The residue (67.8 g.) is crystallized from a mixture of chloroform, acetone and ether to give 1,2,3,4,5,6,7,9,10,11α,12β,13α - dodecahydro-2β-benzoyloxy-12β-methyl-7-oxophenanthrene (48.62 g.) as crystals melting at 178.5 to 179.5° C. Yield, 89.4%.

*Example 5*

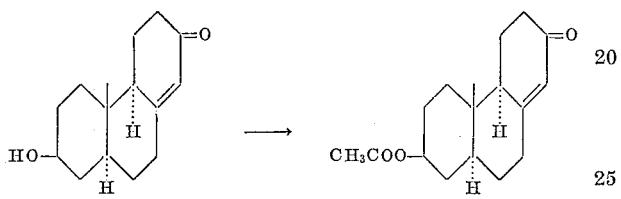

1,2,3,4,5,6,7,9,10,11α,12β,13α - dodecahydro - 2β - hydroxy-12β-methyl-7-oxophenanthrene is acetylated with acetic anhydride and pyridine at room temperature (10 to 30° C.) to give 1,2,3,4,5,6,7,9,10,11α,12β,13α-dodecahydro-2β-acetyloxy-12β-methyl-7-oxophenanthrene as crystals melting at 119 to 122° C./125 to 127° C. (crystallized from a mixture of acetone and ether). Yield, 82.0%.

*Example 6*

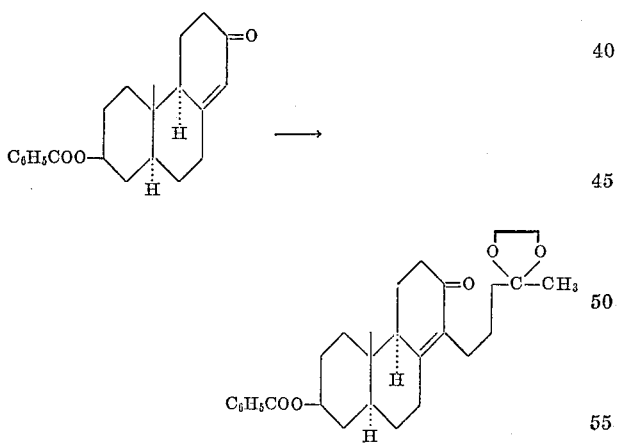

A solution of 1,2,3,4,5,6,7,9,10,11α,12β,13α-dodecahydro - 2β - benzoyloxy - 12β - methyl - 7 - oxophenanthrene (42.5 g.) in anhydrous xylene (1200 ml.) is heated to distill off 150 millilitres of xylene. After cooling to room temperature (10 to 30° C.) sodium hydride (4.66 g.) is added thereto, and the resultant mixture is refluxed for 1 hour in nitrogen stream. Then, a solution of 1-bromo-4-oxopentane ethyleneketal (29 g.) in anhydrous xylene (360 ml.) is dropwise added thereto, and the resultant mixture is refluxed for 3 hours. The reaction mixture is poured onto a mixture of ice and water (180 ml.). The organic solvent layer is washed with water, dried over anhydrous sodium sulfate and the solvent evaporated under reduced pressure to give 1,2,3,4,5,6,7,9,10,11α,12β, 13α - dodecahydro - 2β - benzoyloxy - 8 - (4,4 - ethylenedioxypentyl)-12β-methyl-7-oxophenanthrene (57.3 g.) as an oil.

*Example 7*

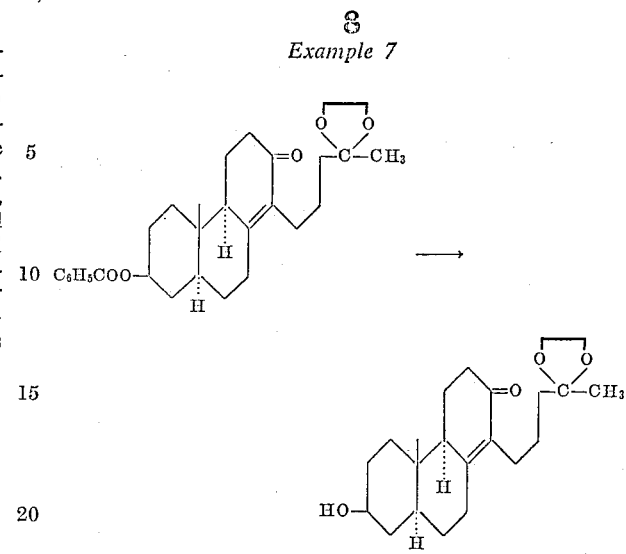

To a solution of 1,2,3,4,5,6,7,9,10,11α,12β,13α-dodecahydro - 2β - benzoyloxy - 8 - (4,4 - ethylenedioxypentyl)-12β-methyl-7-oxophenanthrene (57.3 g.) in methanol (1900 ml.), there is added a solution of sodium carbonate (53 g.) in a mixture of methanol (440 ml.) and water (660 ml.), and the resultant mixture is refluxed for 2 hours on a water bath. The reaction mixture is concentrated under reduced pressure, combined with a mixture of ice and water and shaken with ether. The ether layer is washed with water, dried over anhydrous sodium sulfate and the solvent evaporated to give 1,2,3,4,5,6,7,9,10,11α, 12β,13α - dodecahydro-2β-hydroxy-8-(4,4-ethylenedioxypentyl)-12β-methyl-7-oxophenanthrene (44.07 g.) as an oil.

*Example 8*

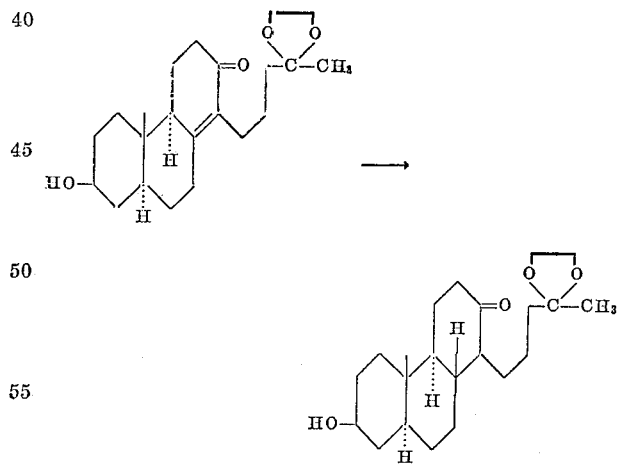

Into a solution of metallic lithium (16 g.) in liquid ammonia (3600 ml.), there is dropwise added a solution of 1,2,3,4,5,6,7,8,9,10,11α,12β,13α-dodecahydro-2β-hydroxy-8-(4,4-ethylenedioxypentyl)-12β-methyl - 7 - oxophenanthrene-(44.07 g.) in anhydrous ether (1400 ml.) in 1 hour while cooling at −70 to −80° C. and the resultant mixture is stirred for 5 minutes. Then, ammonium chloride (107 g.) is portionwise added to the reaction mixture whereby the blue colour disappears. After evaporation of liquid ammonia, the residue is combined with water and shaken with ether. The ether layer is washed with sodium chloride solution, dried over anhydrous sodium sulfate and the solvent evaporated under reduced pressure to give 1,2,3,4,5,6,7,8,9,10,11α,12β,13α,14β - tetradecahydro-2β-hydroxy-8β - (4,4-ethylenedioxypentyl)-12β-methyl-7-oxophenanthrene (42.29 g.) as an oil.

Example 9

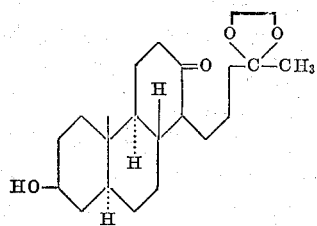

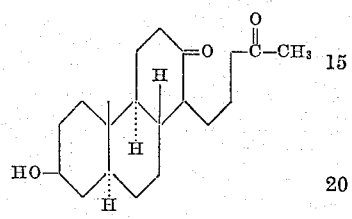

A solution of 1,2,3,4,5,6,7,8,9,10,11α,12β,13α14β-tetradecahydro - 2β - hydroxy - 8β-(4,4-ethylenedioxypentyl)-12β-methyl-7-oxophenanthrene (42.229 g.) in 70% acetic acid (1000 ml.) is heated on a water bath while stirring and water (430 ml.) dropwise added thereto in 15 minutes. Stirring is continued for 15 minutes while heating. The reaction mixture is concentrated under reduced pressure, combined with sodium bicarbonate solution and shaken with ether. The ether layer is washed with water, dried over anhydrous sodium sulfate and the solvent evaporated by distillation to give 1,2,3,4,5,6,7,8,9,10,11α,12β,13α14β-tetradecahydro-2β-hydroxy-8β-(4-oxopentyl)-12β-methyl-7-oxophenanthrene (37.06 g.) as an oil.

Example 10

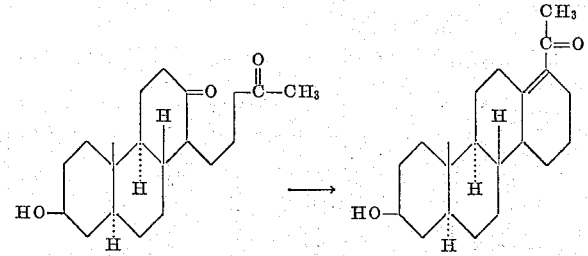

A solution of 1,2,3,4,5,6,7,8,9,10,11α,12β,13α,14β-tetradecahydro - 2β - hydroxy-8β-(4-oxopentyl)-12β-methyl-7-oxophenanthrene (17 g.) in ethanol (100 ml.) is combined with water (1000 ml.) and heated at 85° C. while stirring in nitrogen stream. A mixture of N sodium hydroxide solution (20 ml.) and ethanol (30 ml.) is dropwise added thereto in 15 minutes. The resultant mixture is stirred at the same temperature for 7 hours during which a crystalline product is precipitated. The reaction mixture is cooled and filtered.

The collected substance is dissolved in chloroform, washed with water, dried over anhydrous sodium sulfate and the solvent evaporated under reduced pressure. The resultant oil (12.7 g.) is crystallized from ether to give 3β-hydroxy-20-oxo-18-nor-5α-13(17)-pregnene (6.84 g.) as crystals melting at 156 to 157° C.

The filtrate is shaken with ether. The ether layer is combined with the mother liquor of the above crystallization, washed with water, dried over anhydrous sodium sulfate and the solvent evaporated under reduced pressure. The residue (9.07 g.) is dissolved in ethanol (53 ml.) and diluted with water (530 ml.). The resultant mixture is combined with a mixture of N sodium hydroxide solution (10.6 ml.) and ethanol (15.9 ml.) and heated at 85° C. for 3.5 hours while stirring in nitrogen stream. After cooling, the separated substance is collected by filtration, dissolved in chloroform, washed with water, dried over anhydrous sodium sulfate and the solvent evaporated under reduced pressure. The resultant oil is crystallized from ether to give additional crystals (1.49 g.) of 3β-hydroxy-20-oxo-18-nor-5α-13(17)-pregnene.

Example 11

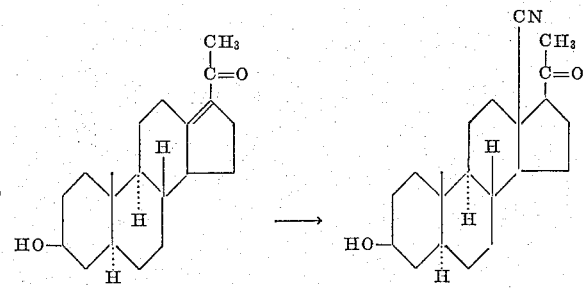

To a solution of triethyl aluminum (5.70 g.) in anhydrous tetrahydrofuran (30 ml.), there is added a solution of hydrogen cyanide (0.81 g.) in anhydrous tetrahydrofuran (10 ml.) while cooling. The resultant solution is added to a solution of 3β-hydroxy-20-oxo-18-nor-5α-13(17)-pregnene (3.02 g.) in anhydrous tetrahydrofuran (30 ml.) while cooling at 0° C. and the resultant mixture is allowed to stand at room temperature (10 to 30° C.) for 1.5 hours in a flask with a stopper. The reaction mixture is poured onto 2 N sodium hydroxide solution while cooling and shaken with chloroform. The chloroform extract is washed with 2 N sodium hydroxide solution and water in turn, dried over anhydrous sodium sulfate and the solvent evaporated under reduced pressure. The crystalline residue (3.52 g.) is crystallized from a mixture of acetone and ether to give 3β-hydroxy-20-oxo-5α-pregnane-18-nitrile (2.55 g.) as crystals melting at 165 to 168° C.

Example 12

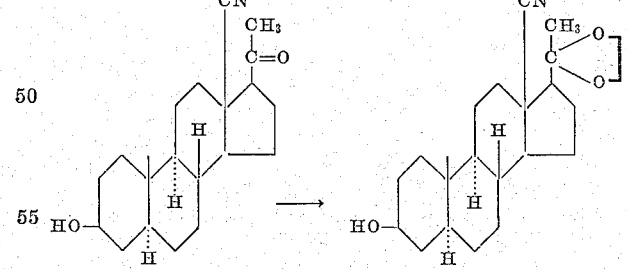

To a solution of 3β-hydroxy-20-oxo-5α-pregnane-18-nitrile (3 g.) in anhydrous benzene (30 ml.), there is added ethyleneglycol (2.28 g.) and p-toluenesulfonic acid (180 mg.), and the resultant mixture is heated in order to distill off an azeotropic mixture of the eliminated water and the benzene. Heating is continued for 5.5 hours with occasional supplement of benzene. After cooling, the reaction mixture is poured onto 2 N sodium hydroxide solution (50 ml.). The water layer is separated and extracted with chloroform. The chloroform extract is combined with the benzene layer, washed with water, dried over anhydrous sodium sulfate and the solvent removed under reduced pressure. The residue (3.6 g.) is crystallized from a mixture of chloroform and ether to give 3β-hydroxy-20,20-ethylenedioxy-5α-pregnane-18-nitrile (3.07 g.) as crystals melting at 189 to 191° C.

Example 13

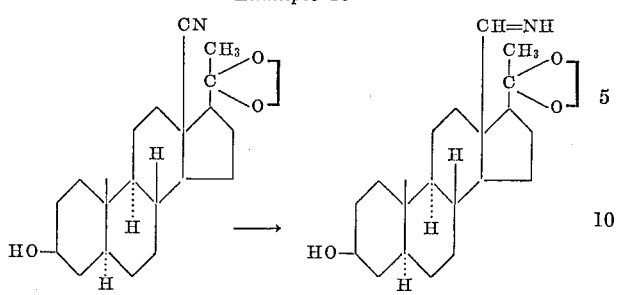

To a stirred suspension of lithium aluminum hydride (500 mg.) in anhydrous tetrahydrofuran (30 ml.), there is dropwise added a solution of 3β-hydroxy-20,20-ethylenedioxy-5α-pregnane-18-nitrile (345 mg.) in anhydrous tetrahydrofuran (10 ml.) in 5 minutes while cooling at 0° C. After the addition is complete, the resultant mixture is refluxed for 4.5 hours. The reaction mixture is combined with a mixture of ice and water and extracted with chloroform. The chloroform extract is shaken with 10% tartaric acid solution. The water layer is made alkaline with solid sodium carbonate while cooling with ice and shaken with chloroform. The chloroform layer is washed with water, dried over anhydrous sodium sulfate and the solvent removed under reduced pressure. The residue (278.5 mg) is crystallized from a mixture of chloroform and ether to give 3β-hydroxy-18-imino-20,20-ethylenedioxy-5α-pregnane (245.9 mg.) as crystals melting at 185 to 201° C.

Example 14

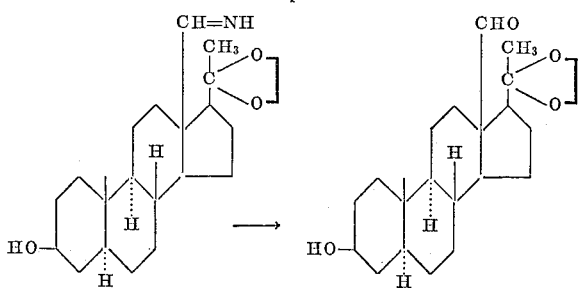

To a solution of 3β-hydroxy-18-imino-20,20-ethylenedioxy-5α-pregnane (213 mg.) in tetrahydrofuran (10 ml.) and methanol (10 ml.), there is added a mixture of acetic acid (1.44 g.), sodium acetate (490 mg.) and water (4 ml.) while cooling with ice, and the resultant mixture is refluxed for 5 minutes on a water bath. After cooling, the reaction mixture is combined with 10% potassium hydroxide solution and concentrated under reduced pressure. The residue is combined with a mixture of ice and water and shaken with chloroform. The chloroform layer is washed with 10% tartaric acid solution, 2 N sodium carbonate and water in order, dried over anhydrous sodium sulfate and the solvent evaporated under reduced pressure. The residue is crystallized from a mixture of chloroform and ether to give 3β - hydroxy-20,20-ethylenedioxy-5α-pregnan-18-al (199.3 mg.) as crystals melting at 186 to 192° C.

Example 15

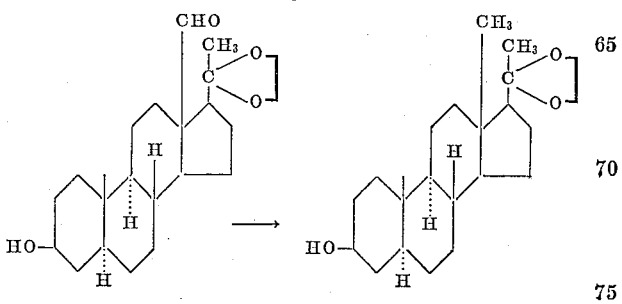

A mixture of 3β-hydroxy-20,20-ethylenedioxy-5α-pregnan-18-al (147 mg.), triethyleneglycol (5 ml.), potassium hydroxide (260 mg.) and 80% hydrazine hydrate (0.735 ml.) is gradually heated on an oil bath and heated at 110 to 120° C. for 30 minutes during which the eliminated water and excess of the hydrazine are distilled off. Then, the mixture is heated at 210 to 220° C. for 3 hours. The reaction mixture is poured onto a mixture of ice and water and shaken with chloroform. The chloroform layer is washed with water, dried over anhydrous sodium sulfate and the solvent evaporated. The residue is crystallized from a mixture of acetone and ether to give 3β-hydroxy-20,20-ethylenedioxy-5α-pregnane (124.4 mg.) as crystals melting at 182 to 183° C.

Example 16

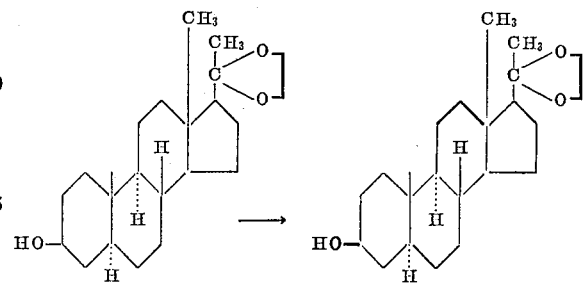

A solution of 3β-hydroxy-20,20-ethylenedioxy-5α-pregnane (97.5 mg.) in acetic acid (1.9 ml.) is heated on a water bath. Water (0.7 ml.) is added thereto. The resultant mixture is heated for 30 minutes at 100° C. After evaporation of the solvent under reduced pressure, the residue is combined with a mixture of ice and water and shaken with chloroform. The chloroform layer is washed with 2 N sodium carbonate solution and water in order, dried over anhydrous sodium sulfate and the solvent evaporated under reduced pressure. The crystalline residue (92.4 mg.) is crystallized from a mixture of acetone and ether to give 3β-hydroxy-20-oxo-5α-pregnane (61.9 mg.) as crystals melting at 191 to 192° C.

What is claimed is:

1. 1,2,3,4,5,6,7,9,10,11α,12β,13α - dodecahydro - 2β-acyloxy - 8 - (4,4-ethylenedioxypentyl)-12β-methyl-7-oxophenanthrene, acyloxy being a member selected from the group consisting of lower alkanoyloxy, benzoyloxy and alkylbenzoyloxy.

2. 1,2,3,4,5,6,7,9,10,11α,12β,13α - dodecahydro - 2β-benzoyloxy-8-(4,4-ethylenedioxypentyl) - 12β - methyl-7-oxophenanthrene.

3. 1,2,3,4,5,6,7,9,10,11α,12β,13α - dodecahydro - 2β-hydroxy - 8-(4,4-ethylenedioxypentyl) - 12β - methyl-7-oxophenanthrene.

4. 1,2,3,4,5,6,7,8,9,10,11α,12β,13α,14β - tetradecahydro-2β-hydroxy-8β-(4,4-ethylenedioxypentyl)-12β-methyl-7-oxophenanthrene.

5. 1,2,3,4,5,6,7,8,9,10,11α,12β,13α,14β - tetradecahydro - 2β - hydroxy-8β-(4-oxopentyl)-12β-methyl-7-oxophenanthrene.

6. 3β-hydroxy-20-oxo-18-nor-5α-13(17)-pregnene.

7. 3β-hydroxy - 18 - imino - 20,20 - ethylenedioxy-5α-pregnane.

8. 3β-hydroxy-20,20-ethylenedioxy-5α-pregnan-18-al.

References Cited by the Examiner

UNITED STATES PATENTS 3,014,028  12/61  Ruzicka et al. _____ 260—239.55
3,092,627  6/63   Wettstein et al. _____ 260—239.55

OTHER REFERENCES

Nagata et al.: Tetrahedron Letter, No. 14, July 1963, pp. 865–868.

LEWIS GOTTS, *Primary Examiner*.